Nov. 20, 1928.

W. T. HOFMANN 1,692,210

APPARATUS FOR PRODUCING ROOFING ELEMENTS AND PRODUCT THEREOF

Filed Feb. 6, 1926  6 Sheets-Sheet 1

Witness:
Stephen T. Rebora

Inventor:
William T. Hofmann
by Frank L. Belknap
Atty.

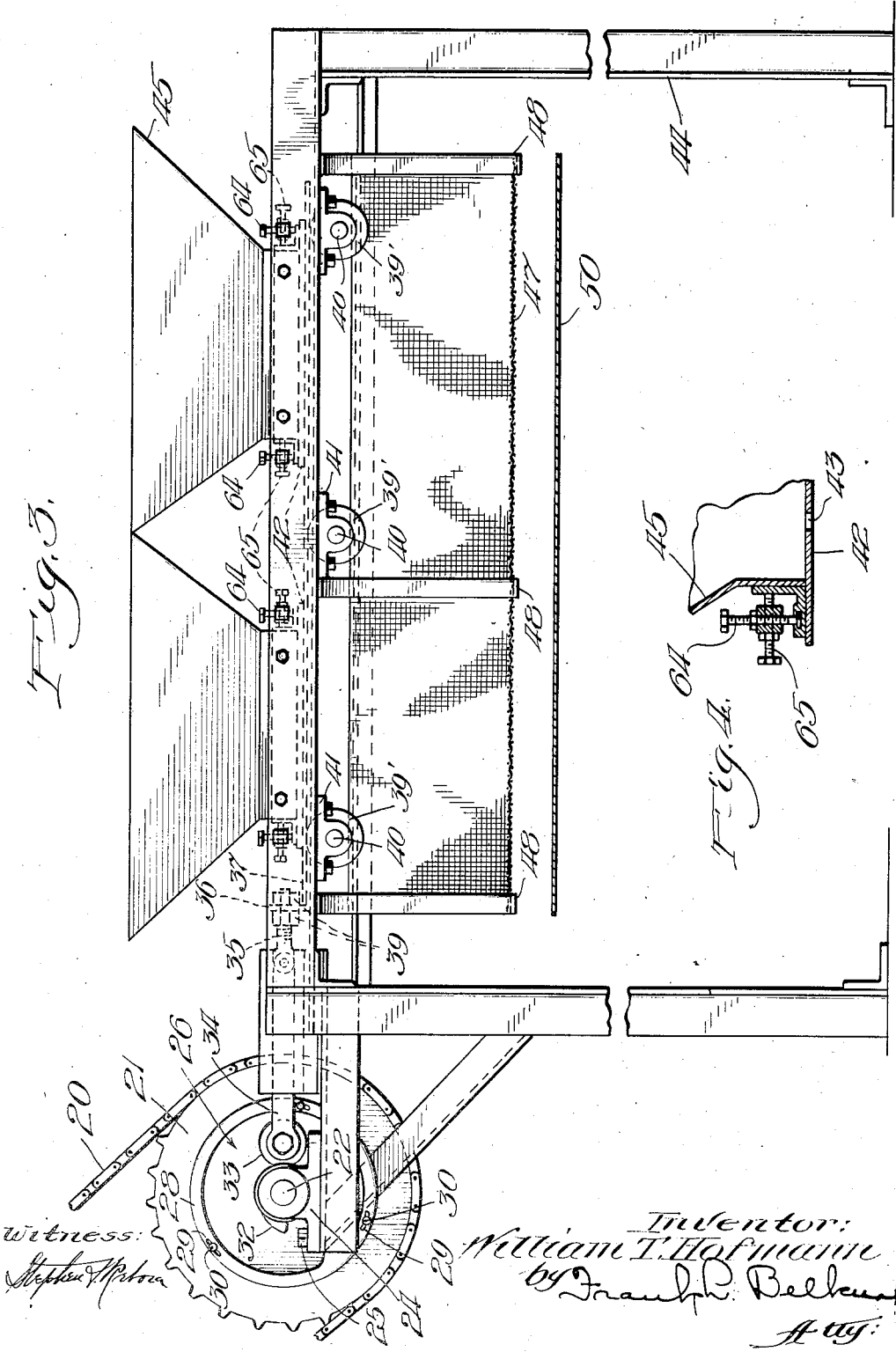

Nov. 20, 1928.
W. T. HOFMANN
1,692,210
APPARATUS FOR PRODUCING ROOFING ELEMENTS AND PRODUCT THEREOF
Filed Feb. 6, 1926    6 Sheets-Sheet 3
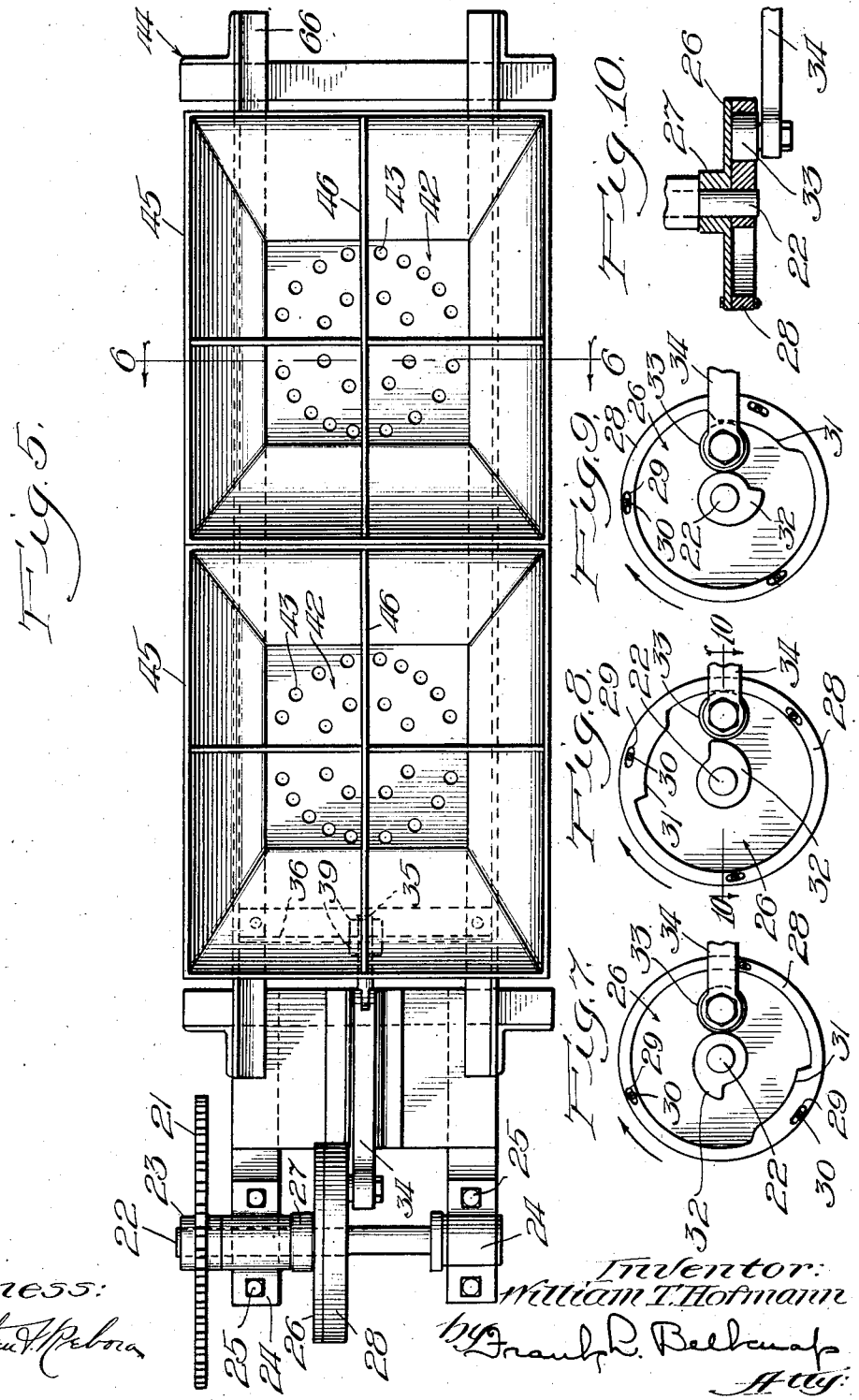

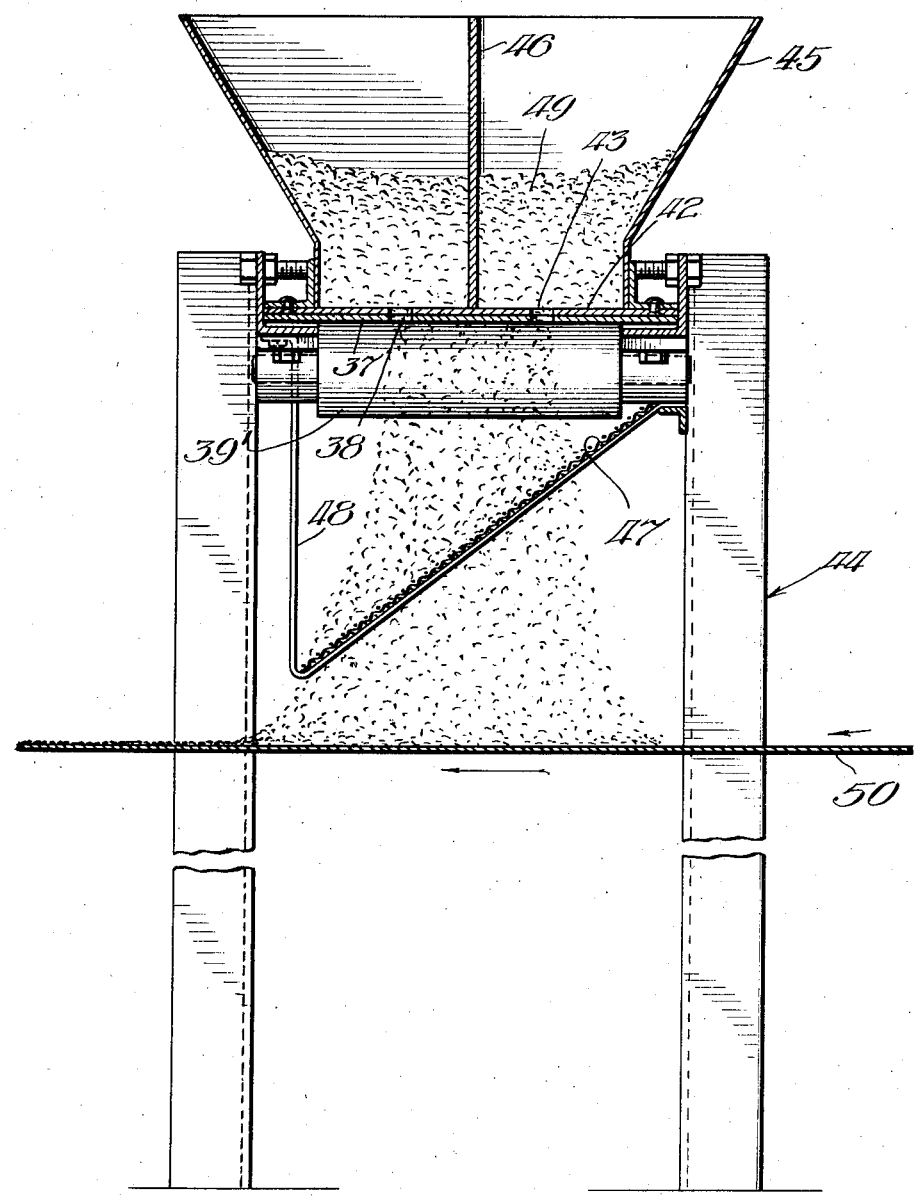

Nov. 20, 1928.  W. T. HOFMANN  1,692,210
APPARATUS FOR PRODUCING ROOFING ELEMENTS AND PRODUCT THEREOF
Filed Feb. 6, 1926  6 Sheets-Sheet 5
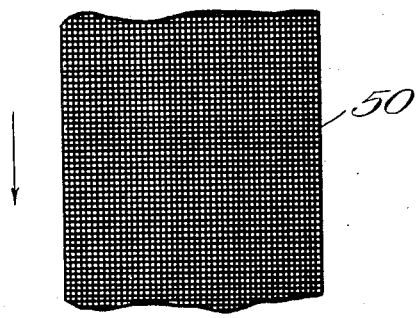
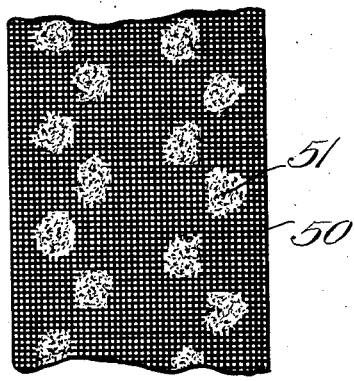
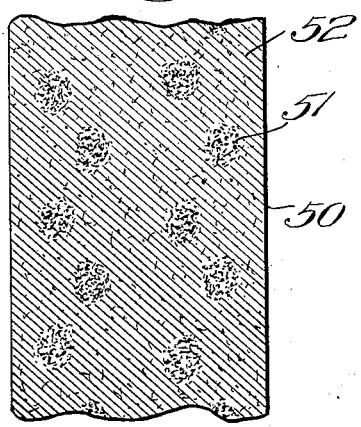
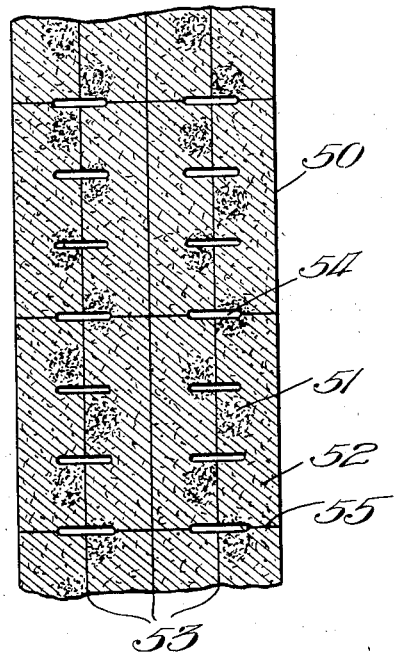
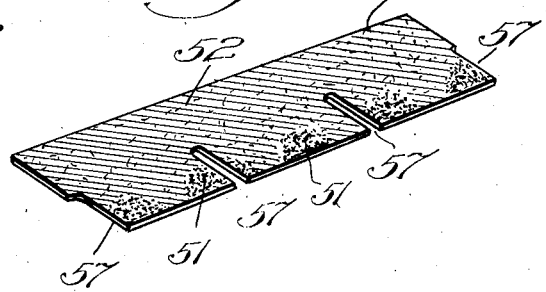

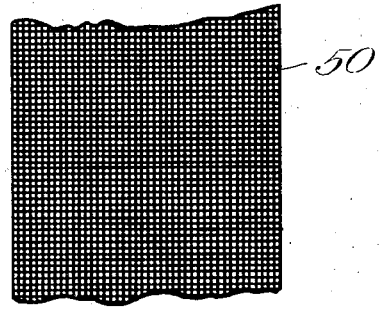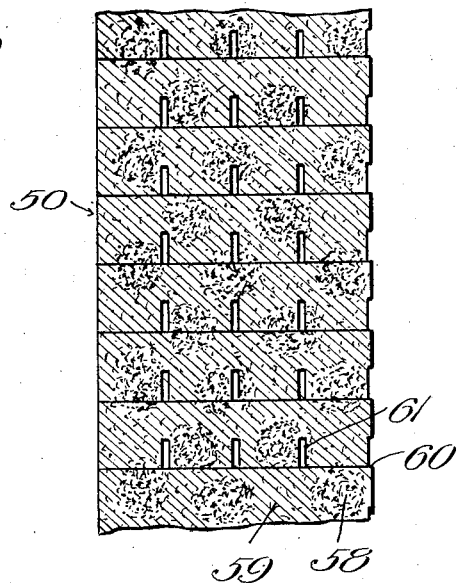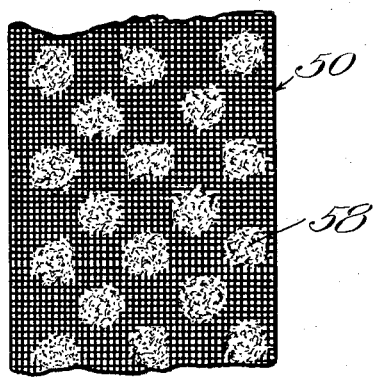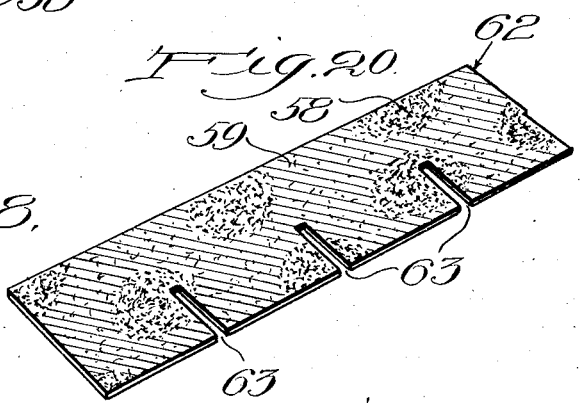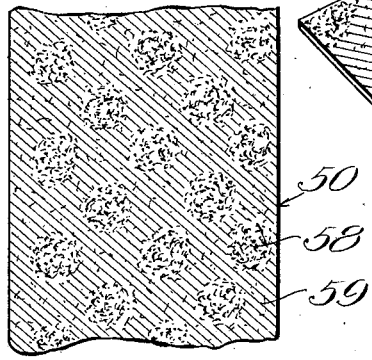

Patented Nov. 20, 1928.

1,692,210

UNITED STATES PATENT OFFICE.

WILLIAM T. HOFMANN, OF LA GRANGE, ILLINOIS, ASSIGNOR TO BECKMAN-DAWSON ROOFING CO., OF CHICAGO, ILLINOIS, A CORPORATION OF ILLINOIS.

APPARATUS FOR PRODUCING ROOFING ELEMENTS AND PRODUCT THEREOF.

Application filed February 6, 1926. Serial No. 86,464

This invention relates to apparatus for producing roofing elements and product thereof, and refers more particularly to the production of what are termed strip shingles having areas or fields of contrasting colors.

More specifically, the present invention is directed to an apparatus for producing strip shingles having clearly defined fields of contrasting color, or what are more commonly known as colordrift or variegated color strips in which the strip has a predominating base color, and also areas of other colors blended together to present the appearance when laid on a roof of broken irregular areas of blended and unblended colors.

The invention is applicable to the production of slabs, strips, individual, multiple or rolled roofing.

Briefly, the present invention comprises apparatus for first depositing on separated spaced areas of a sheet of saturated and coated roofing felt, granular material of a certain predetermined color, the color of which may be gradually varied on successive areas of the forwardly moving sheet, or the granular material may be a blend of different colors.

The base coat of granular surfacing is then applied over the then unsurfaced areas, adhering to the coated sheet on said areas, and not adhering to those areas where the previously described contrasting colored grit was applied. This sheet may be then wound and rolled, and used in this way, or severed into strips or slabs.

Figure 1:
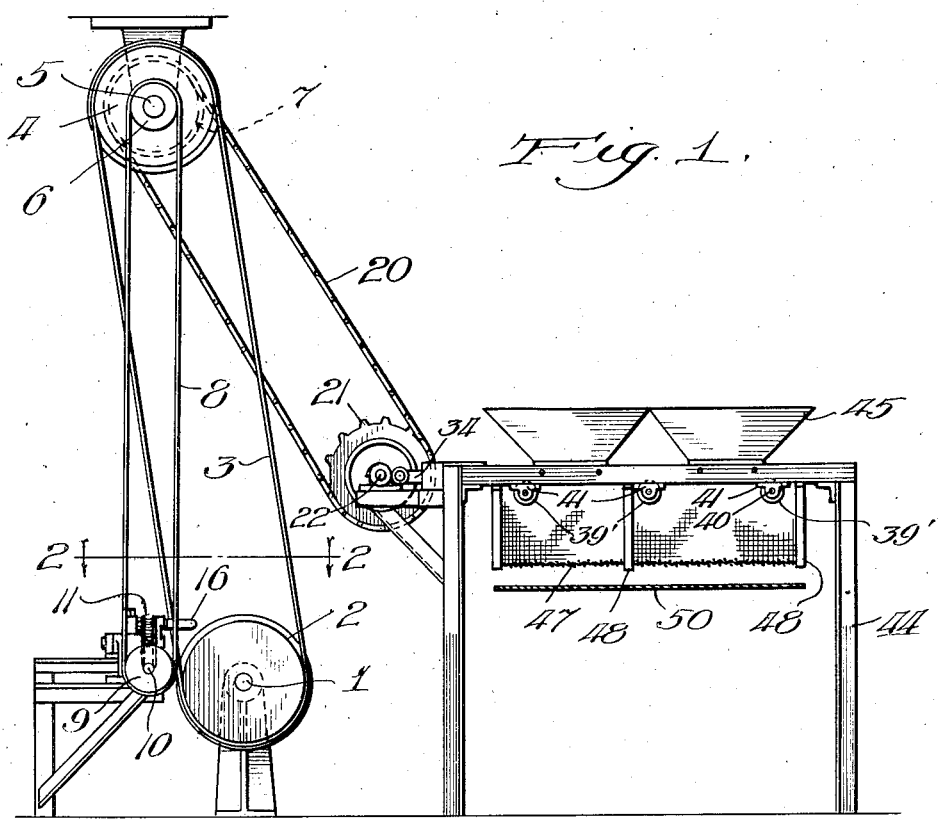

In the drawings, Fig. 1 is a side elevational view of the apparatus for carrying out the present invention.

Figure 2:
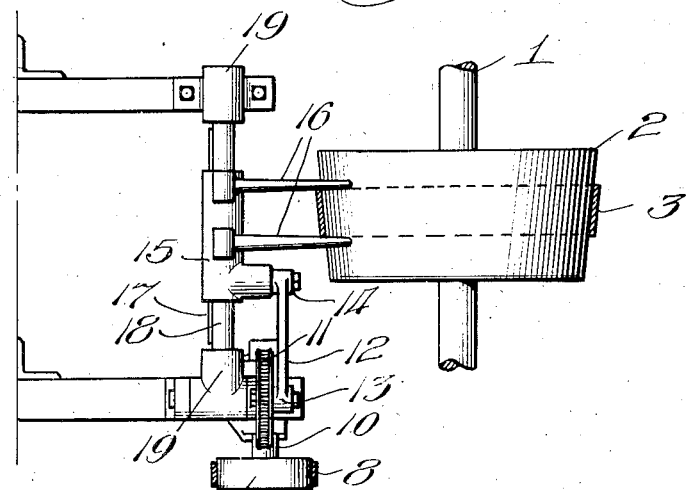

Fig. 2 is a cross sectional view on lines 2—2 of Fig. 1. Fig. 3 is an enlarged side elevational view showing the hoppers and general arrangement shown in Fig. 1, but eliminating the drive.

Fig. 4 is an enlarged fragmentary cross sectional view showing the screw adjustments for the hopper. Fig. 5 is a top plan view of Fig. 3. Fig. 6 is a cross sectional view taken on line 6—6 of Fig. 5. Figs. 7, 8 and 9 are enlarged face views of the cam arrangement for the distribution of the granular material. Fig. 10 is a cross sectional view taken on line 10—10 of Fig. 8. Figs 11 to 15 are face views illustrating the method of applying the colordrift granular material to predetermined spaced areas of a sheet of roofing material which is subsequently to be severel longitudinally and notched and severed transversely to provide a multiple shingle strip having the colordrift areas on the exposed face, and no colordrift areas on the overlapping portions laid to the weather.

Figs. 16 to 20 are views similar to Figs. 11 to 15 illustrating the method of applying the colordrift granular material to spaced areas of the sheet, which sheet is subsequently to be severed transversely and notched longitudinally to produce individual shingle strips in which the colordrift areas are disposed over the entire face of the sheet, including the surface which is eventually overlapped and laid to the weather.

Referring in detail to the drawings, 1 designates the driving shaft receiving its rotating power from any suitable source such as a motor, not shown. A cone pulley 2 may be keyed to said shaft 1 having a pulley belt 3 adapted to rotate a similar cone pulley 4 disposed oppositely in relation to the cone pulley 2. This pulley 4 is keyed to the shaft 5 on which shaft are also keyed the flanged smaller pulley 6 and sprocket wheel 7. The pulley wheel 6 drives the pulley belt 8 which rotates the small flanged pulley wheel 9 mounted on the shaft 10, as shown more clearly in Fig. 2. This shaft 10 may be provided with a worm (not shown) intermediate its length adapted to mesh with the worm gear 11. An arm 12 is attached at 13 eccentrically on one surface of the worm gear 11 having connection at 14 to the body 15 on which are mounted shifter arms 16. This body 15 is internally grooved (not shown) adapted to register with the key 17 on stationary shaft 18 mounted in supports 19, the arrangement being such that the body 15 shifts or rather reciprocates on the stationary shaft 18, being guided and prevented from rotation by the key 17. The arrangement just described permits of a constant change and varied speed which is entirely automatic.

The sprocket 7 communicates through the pulley belt 20 with a smaller sprocket 21 keyed to shaft 22, the sprocket wheel 21 being provided with the usual hub 23. The shaft 22 is mounted in the bearing 24 supported on the frame of the machine and attached by means of the bolts 25, and is provided intermediate its length with the disk 26 having hub 27. A movable cam ring 28 is attached to the face of the disk 26 opposite the hub 27, said ring 28 being provided with slots 29 registering with the pins 30 on the disk, allowing for annular adjustment. This cam ring 28 is provided with an inwardly extending cam 31, the function of which will be apparent from the following description:

Also mounted on the shaft 22 is an adjustable cam 32 adapted to register with the roller 33 carried by the connecting arm 34.

The arm 34 at its inner end may be screw threaded at 35, and is connected with an upturned end 36 of a movable plate 37, which plate may be provided with spaced perforations 38. The adjusting nuts 39 are provided registering with the screw threaded end 35 of arm 34 in an obvious manner. The movable plate 37 is adapted to roll on the rollers 39 mounted on shafts 40, which shafts are supported in the supporting brackets 41 attached to the frame of the machine.

A stationary plate 42 having apertures 43 may be superimposed over the lower movable plate 37, this stationary plate 42 taking the form of a single plate or a number of adjacent plates, it being advisable to make the apertures 38 and 43 in both plates simultaneously in order that they may register. The frame of the machine may be designated as a whole at 44.

A bottomless hopper 45 provided with interior partitions 46 may be mounted just above the stationary plate or plates 42, the stationary plate 42 providing a bottom for the hopper, said hopper in reality comprising only the side walls and partitions. The arangement is such that any number of hoppers may be used, or any number of partitions in a hopper to suit the desires of the operator, and the product being made. It will be noted that I have shown two hoppers, but one or any other number may be provided without interfering with the novelty of the present invention.

Below each hopper is mounted a screen 47 supported by means of the angle irons or rods 48, which screen 47 may be disposed at any distance below the bottom movable plate 37 or at any angle from the horizontal. The mesh of this screen will be determined by the size of the grit and the amount of blend, it being advisable to provide a screen of just the proper mesh so that the grit will be uniformly distributed. The purpose of the screen is to distribute the granular material over selected spaced areas of the sheet, breaking same up so that it does not fall on the sheet in the form of lumps.

Each compartment in the hopper is adapted to be filled with granular material designated at 49, adapted to be deposited on the sheet designated 50.

The operation of the machine should be apparent from the foregoing description. A sheet of roofing felt previously saturated and coated as shown at 50 in Figs. 11 and 16, is fed to the machine. The surface coating of this felt is still in an adhesive condition. Granular surfacing material 49 of the same or different colors as desired, is placed in the hoppers 45. The motor driving shaft 1 is put into operation, which through the mechanism heretofore described, causes the movable plate 37 to be reciprocated, to bring the aperture 38 into registration with the aperture 43 in the stationary plate 42. When these apertures 38 and 43 are in registration, granular material will fall therethrough by gravity, as clearly shown in Fig. 6, falling on the screen 47 and there being broken up and distributed to cover a spaced area in the sheet 50. When it is desired to produce effect shown in Fig. 12, in which the granular surfacing occupies the spaced areas 51, leaving the central portion of the sheet without any granular surfacing, as well as the portions adjacent the edges, the partitions in the hopper or a number of hoppers, may be so arranged that no deposits of granular material are made on this central portion, nor the portions adjacent the edges.

For the purpose of illustration, I will now discuss Figs. 11 to 15. The sheet after having the spaced areas of granular surfacing applied in the form of sunbursts as shown in Fig. 12, may be then passed to the usual mechanism for applying granular surfacing over the entire surface of the sheet, said granular surfacing being the base coat and adhering to the then unsurfaced areas of the sheet as shown at 52 and not adhering to the already surfaced areas where the sunbursts have been applied. Assume that the sheet shown in Fig. 13 is thirty-two inches wide,— it may be from thirty-two to sixty-four inches wide or any predetermined width. This sheet may be then wound into roll form and sold as roll roofing, or it may be desired to produce strips therefrom. Where such is the case, such a sheet may be severed longitudinally as shown at 53, notched transversely as shown at 54, and severed at regular intervals as shown at 55, between sets of notches. This will produce a strip designated 56 provided with the notches 57 adjacent its lower edge, said strip being surfaced with a base coat of granular material 52 and provided with the spaced sunburst areas 51, it being obvious that these sunbursts are disposed then on the surface of the strip which is to be exposed, the portion of said strip which is overlapped and laid to the weather, being surfaced with the usual base coat of granular surfacing as shown at 52.

I will now describe Figs. 16 to 20. The sheet 50 of saturated felt has a coating of adhesive material such as asphalt applied to one surface, and is fed to the machine. The partitions in the hoppers and the hoppers themselves are so arranged in an obvious manner that the granular material is deposited in substantially uniformly spaced areas over the entire surface of the sheet as shown at 58. The base coat of granular surfacing 59 is then applied in the manner described heretofore. The sheet may be then wound ino roll form and sold as rolled roofing, or may be severed. Assume that the sheet is thirty-two inches wide. It is severed transversely as shown at 60 and notched longitudinally adjacent the lines of severance as shown at 61. This provides a strip 62 shown in Fig. 20 provided with the notches 63, in which the sunbursts 58 are disposed in spaced areas over the entire surface of the strip including the portion which will eventually be overlapped and laid to the weather.

As a feature of the present invention, to prevent the formation of a continuous design, it is desirable that the speed of reciprocation of the movable plate 37 be changed relative to the constant speed of the forwardly moving felt. This is accomplished in a very ingenious manner by the cone pulleys arrangement 2 and 7, the worm gear arrangement 11 and the shifting device 15 and 16. In practice, it has been found that the speed of this movable plate is constantly changing, at times being relatively slow, and at other times being relatively fast. The advantage of this will be instantly apparent.

Attempts have been made during the past few years since the advent of colordrift roofing to prevent the formation of a continuous design, and the only successful method heretofore devised, has been by hand, which of course, is expensive, labor wasting and impractical.

In practical operation it is desirable that the lower surface of the stationary plate 42 make a slight contact with the upper surface of the movable plate 37 to prevent frictional loss. In case it is necessary to adjust the relation of these two plates, the plate 42 may be raised or lowered by the adjusting screws 64. In case it is desired to slightly adjust the position of the hopper 45 it may be accomplished by manipulating the adjusting screw 65. The reciprocating plate 37 moves on the track 66, which constitutes part of the supporting structure.

I wish to emphasize that the present invention contemplates the depositing of granular material in the form of sunbursts in spaced areas of the sheet, which granular material may be of the same color, or of a blend of different colors. One of the main objects of the invention, is to deposit these sunbursts irregularly on the sheet and prevent the formation of a continuous design, which is one of the difficulties with the present methods and machines for producing colordrift roofing. The two hoppers as shown in Figs. 3 and 5 may be used to produce the roofing illustrated in Figs. 11 to 15, while the single hopper such as shown in Fig. 6 may be used to produce the effect illustrated in Figs. 16 to 20.

It is obvious of course, that the screen 47 may be movable or stationary.

I claim as my invention:

An apparatus of the character described, comprising in combination means for feeding a roofing sheet, means for distributing granular material on spaced areas of said sheet, comprising stationary and movable apertured plates superposed relative each other, a container for granular material mounted above the plates, means for actuating the movable plate to bring the apertures of both plates into and out of registration to cause the granular material to pass through said apertures, and means for continuously changing the speed of movement of said movable plate.

WILLIAM T. HOFMANN.